Reissued Feb. 12, 1935 Re. 19,463

UNITED STATES PATENT OFFICE 19,463

MAKING CONDENSATION PRODUCTS OF UREA AND ALDEHYDE

Kurt Ripper, Berlin, Germany, assignor, by mesne assignments, to American Cyanamid Company, a corporation of Maine No Drawing. Original No. 1,762,456, dated June 10, 1930, Serial No. 740,406, September 27, 1924. Application for reissue June 9, 1932, Serial No. 616,358. In Austria August 25, 1924

19 Claims. (Cl. 260—3)

This invention relates to the manufacture of condensation products from urea, derivatives of urea or materials which during the treatment produce urea or derivatives thereof on the one hand and aldehydes, particularly formaldehyde, on the other. According to known methods for manufacturing such condensation products liquid initial condensation products are prepared, which represent the hydrosol of the emulsion colloid formed by the two starting materials. If these sols are transformed into gels forming either thin layers, such as lacquer-coatings, or more compact bodies, such as products turned (as in a lathe), or imitations of glass, there is always a remainder of the aqueous solvent retained by the mass, which remainder shows a marked vapor tension. By this tension the practical utilization of the condensation products is limited to a certain extent. If the tension of the water vapors in the medium surrounding the mass is less than that in the latter, water vapors will escape from the gel after some time. On the other hand, if the pressure of the water vapors of the surrounding medium is above the pressure within the material, water vapors will be adsorbed by the latter from the surrounding medium. Both these proceedings are disadvantageous, even detrimental to the mass and in the case of the hardened mass being stored up for a long time may cause fissures or cracks in the material. Another drawback due to the use of water as dispersing agent is, that influencing the physical, especially the elastic properties of the mass, is almost impossible, as nearly none of the substances appropriate for such influencing can be dissolved to produce clear solutions. Finally also the disadvantageous property of these hydrogels may be mentioned, that they lose their glass-like aspect at higher temperatures.

Now I have found that all these disadvantages can be prevented, if provision is made for small quantities of such organic media being present within the gels, which are capable of forming transparent solutions or mixtures with the condensation product of urea and formaldehyde. Especially favorable results can be obtained, if the water is entirely or partly removed and substituted by said organic media, an organo-sol of the condensation product being thus formed either entirely or partly, which organo-sol by hardening is transformed into an organo-gel.

For removing the water, having served as dispersion medium, from the sol, and for replacing it by an organic medium prior to the sol being transformed into the gel, different ways may be chosen. So for instance the greatest part of the water may be expelled mechanically by hydrophobe conduct of the polymerization process, or else the mass may be hydrophile, in which case the greatest part of the water is removed in a vacuum. This may be done in accordance with the process described in Ser. No. 700,736 filed March 20, 1924, Patent No. 1,687,312 of October 9, 1928. The cited application deals with a process in accordance with which a neutral or alkaline mixture of urea and formaldehyde is caused to be boiled for a short time and then the reaction product produced is further treated in an acid medium. By means of the addition of an acid reacting condensation means it happens in a determined period of time that the emulsion colloid arising is a hydrophobe, that is to say, the water separates for the greater part on cooling and the remaining water amounts to no more than that which can be absorbed.

Thereafter the hydrophobe or hydrophile colloid, which still contains a small fraction of the original quantity of the employed water, is treated with non-aqueous, organic media (solvent A) in order to remove the remainder of the water as far as possible. The best result is obtained, if such organic agents are used, which are capable of forming with water vapors binary, ternary or quaternary mixtures of vapors (Confere. g. Beilstein-Prager-Jacobson, Vol. I, (4th edition, 1918) page 295). By treatment with these agents, preferably effected in vacuo, the greatest part of the water still present can be removed. The sols must contain so much of liquid constituents that their state of consistency allows pouring into molds. This state may be obtained by the first added organic media, or, if not, by adding further agents (solvents B), capable of expelling and replacing the water entirely or partly, when the mass has already attained the state of a gel. After setting (congealing, solidifying) the gel must contain organic media (hereinafter called "solvent C"), which may either be added to the mixture of the starting materials or at any convenient stage of the process, that is to say either to the sol or to the gel.

If it is intended to obtain clear products, such organic solvents are to be chosen, which are capable of forming with the generated gel clear solutions, either by dissolving it or else by being dissolved themselves by the gel. For obtaining the desired effect the amount of the organic agent must not necessarily be such as to suffice for alone building up the structure of the gel. On the contrary it is sufficient, if the water present in the condensation products of urea and formaldehyde is partly replaced by an organic medium or if said organic medium, even in the presence of water, partakes in or contributes to forming the structure of the gel. If the organic agent (solvent C) destined to form part of the gel, is by itself capable of being partially removed during evaporation of the water, by generation of volatile vapor mixtures, the addition of the solvent A may be dispensed with. In like manner also the addition of the solvent B may under like circumstances be omitted.

Organic solvents of the most various kinds may be used as solvent A, such as for instance hydrocarbons, alcohol, ether, aldehyde, ketones and the like, or mixtures thereof which may be either of the aliphatic, aromatic or hydro-aromatic series, which possess the faculty of forming with water vapors volatile vapor mixtures, in order to remove the water entirely or partly from the mass as long as the latter is in the stage of a sol, and to replace it.

For use as solvents B such organic solvents are appropriate which possess the property of removing entirely or partly the water from the mass, when in the state of the gel, and of replacing it therein.

As solvent C such media are adapted, for which the congealed emulsoid possesses a special dissolving capacity, it being not necessary, that these media be liquid. Of course such substances have mostly a pronounced capacity for dissolving themselves the emulsoid and in many cases it cannot be distinguished with full certainty, which of the constituents of such mixture is to be regarded as the solvent and which as the dissolved one. Consequently the substances adapted for this purpose may be of most various composition. So for instance glacial acetic acid has about the same effect as benzylalcohol, and glycerine an effect similar to that of concentrated formic acid or sugar. It is to be seen, therefrom, that the essential item in this connection is not the chemical composition of the substance destined to remain within the final product, but its property of being either clearly dissolved by gels or else of dissolving them so as to form a clear solution.

According to the different uses the final product may be intended for, the amount and the kind of the solvents will vary. For producing e. g. lacquers preferably such organic solvents are used, the boiling point of which is as low as possible, and by repeated addition and distillation the substantially total amount of water is removed from the emulsoid. If solid masses are to be made, care is to be taken to operate with as small quantities of solvents as is possible. For this purpose it may be possible to dispense with the use of solvent A and to add only the solvents B and C to the emulsoid concentrated by evaporation as far as possible, and thereafter hardening the mass. Thereby the thickening of the emulsoid by evaporation is advantageously effected in vacuo in order to avoid premature influence of too high temperatures. In this manner gels can be produced, the water vapor pressure of which is substantially naught and whose other properties are by the described method altered to such degree, that the greatest variation of the vapor tension of the surrounding atmosphere has no influence on the mass. Furthermore the latter does not show any more the disadvantage of losing its glasslike aspect and transparency at higher temperatures.

In practice the hereinbefore described method can be utilized for various and manifold purposes. It is not limited to the manufacture of pure condensation products of urea and aldehydes only. On the contrary mixtures of said condensation products thus prepared, with other plastic substances or agents provoking plasticity and with organic media of all kind may be made, provided that these additions are capable of forming clear solutions with the emulsoids or with the mixtures of emulsoids under consideration.

So I have found that particularly all celluloses, derivatives of cellulose and products of decomposition or transformation of cellulose form transparent, uniform (homogeneous) mixtures with the emulsoid. By variation of the proportions of the constituents of such mixtures any desired degree of elasticity can be obtained. Lacquers may for instance thus be produced, which have the suppleness of cellulose-ester lacquers and at the same time allow polishing to the highest degree. Such lacquers are in no way affected by moisture or water and show considerable electric insulating power. They may be employed without any filling materials in a state as clear as water or glass and will give highly brilliant, water-proof insulating coatings, which very well resist atmospheric influences. But on the other hand they may also be mixed with any inorganic or organic, soluble or body colors, with filling materials of all kinds, etc.

The organosols consisting of a mixture of urea-aldehyde emulsoids and cellulose-derivatives can be utilized for manufacturing artificial silk. For this purpose the solution is caused to enter from very fine nozzles into a precipitating (setting) bath, preferably water or some aqueous solution of an electrolyte. By spinning the fine threads thus produced a yarn is obtained which is much less affected by water than any kind of artificial silk known hitherto, and which can easily be dyed. Furthermore the advantage is offered that by variation of the proportions of the mixture any desired degree of hardness and strength can be obtained. Silks may be made containing only a few per cent of condensation products from urea and formaldehyde up to such containing about 50%.

Besides the silk yarns also thicker threads may be produced, such as imitations of hair, horsehair and the like.

Existing kinds of yarn or fabrics, especially of artificial silk, may be treated with such organosols, in which case some sort of "filling" and "aggravating" (roughening of the surface) takes place, not known heretofore. According to the composition of the organosol employed therefor the yarn or artificial silk will become either harder or softer, but in any case considerably less sensitive to water and detergents (soap, etc.).

Furthermore said mixtures can advantageously be employed for manufacturing non-inflammable films and photographic plates. Also in this case variation of the proportions of the ingredients enables of making products answering all special requirements. For producing kinematic films, requiring the highest possible degree of elasticity, relatively large proportions of cellulose derivatives are to be employed, while e. g. for plate films, replacing glass-plates of perfect form without the risk of breaking, small amounts of such derivatives are sufficient.

The mass may also be utilized for manufacturing a substitute for optical glass. In this case great hardness and adjustability to different values of the optical constant are required. For this purpose a liquid is chosen as addition, which is soluble in the mass and has a very high boiling point. By variation of the amount of this liquid said adjustment can be effected.

It is also possible to introduce (say in solution, if desired) camphor, borneol or the like into the condensation products of urea and aldehydes and to obtain also clear mixtures. If only small quantities of camphor or borneol are added the gels thus composed possess, when hardened in general nearly the same properties as the crystal-like products free of camphor or borneol but they are more supple or softer and therefore can be easier worked by mechanical means than those made with liquid organic solvents only.

Products of quite different properties are obtained by employing larger quantities of camphor or borneol, especially when mixed with hydrophobe materials. In such case the masses become highly plastic and doughlike. Plates, sticks, rods, tubes and any other sort of compact or hollow bodies may be made therefrom, which in contradistinction to masses made with smaller quantities of dispersing agents show the peculiar property of softening in the warmth, thus enabling of easier working. While the heretofore known condensation products of urea and formaldehyde did not allow stamping, these mixed masses can be stamped even when fully hardened in order to manufacture various articles therefrom, such as buttons, combs and the like.

The hardening of the masses composed according to the present disclosures may be effected as usual by employing heat or else in the cold that is to say at ordinary temperature. In general all the conditions and indications mentioned above will also apply, when hardening in the cold is intended, but in the latter case, owing to the omission of the influence of higher temperatures, some small quantities of water may remain within the mass. Consequently such products may not fully show all the perfect qualities of masses hardened by the heating method. Nevertheless there may be cases where operating at ordinary temperature is preferred, either for the reason, that employing heat is not possible or that very rapid hardening is desired. So for instance this method may be chosen for producing glass-clear castings (e. g. for sculpture), which hitherto could not be made by known means.

As is seen, the products obtained by the present method are of various forms and properties, but they all are characterized by the feature, that their water-vapor tension is eliminated or reduced to a minimum by the presence of an organic medium, or at least its effect is obviated. The products therefore represent in the hardened state perfectly unalterable, stable, transparent gels. Their physical and particularly elastic properties can be influenced within very wide limits. The hardened products possess great electric insulating power and become electrically charged themselves on rubbing.

*Examples*

*I*

150 parts by weight of a hydrophobe intermediate condensation product of urea and formaldehyde are dissolved in 50 parts by weight of ethyl alcohol and 15 parts by weight of amylacetate (solvent B) are added to the solution. The solution thus obtained is thickened by distillation, then 15 parts by weight of benzyl-alcohol are added and distillation is continued for short time. Thereafter the mass is poured into molds and hardened at a temperature of about 100° C. until the weight of the entire mass remains constant. The product has the same aspect as the condensation product of urea and formaldehyde when hardened, that is to say it is transparent and clear as glass or pebble-crystal, but it shows no water-vapor tension at all or almost none and is stable (unalterable) for unlimited time.

*II*

150 parts by weight of a hydrophobe intermediate condensation product from urea and formaldehyde are dissolved in 50 parts by weight of alcohol and 5 to 10 parts by weight of benzene, (in the trade called "benzol") are added to the solution. This mixture is distilled in a vacuum, a ternary mixture of water, benzene and alcohol being thus caused to escape. After about half of the entire mass has been distilled off, alcohol and benzol are again added and distilling off is continued. In this manner it is possible to remove nearly the whole amount of water within short time. To the alcoholsol of the condensation product again 50 parts by weight of alcohol are added, in which two parts by weight of borneol have been dissolved, and distillation is continued until the consistency of syrup is attained. When this mass at temperatures up to 100° C. is hardened until its weight remains constant, it will also represent a transparent, perfectly stable organo-gel.

*III*

150 parts by weight of a hydrophile condensation product from urea and formaldehyde are condensed in vacuo to the consistency of syrup and thereafter mixed with 15 parts by weight of benzyl-alcohol and 2 parts by weight of amyl-acetate. The mixture is then poured into molds and hardened. The remainder of the water, held by the jelly, can be driven off at a raised temperature. The gels thus obtained are transparent, clear as glass and stable.

*IV*

100 parts by weight of a hydrophile condensation product of urea and formaldehyde are concentrated so far, that a 90% hydro-sol remains. To this hydro-sol 50 parts by weight of glacial acetic acid are added. This solution is now mixed with 125 parts by weight of a 10% solution of collodion cotton (nitrocotton or nitrocellulose) in glacial acetic acid and to the clear mixture 25 parts by weight of amyl-acetate, 25 parts by weight of ethyl acetate and 10 parts by weight of toluol as an organic diluent are added. The resulting product is a lacquer solution, which in any convenient manner can be applied to all sorts of objects. After drying, whereby the remaining water will be driven off, the coating will be highly brilliant, very elastic, transparent, capable of being polished, and will become electric when rubbed.

A solution made in similar manner with modified proportions can be expelled from very fine nozzles into an aqueous solution serving as precipitating (solidifying) bath and the threads thus obtained can be spun to artificial silk, which proves to be superior to any known kind of artificial silk as far as insensibility to water, exuberance and fitness for being dyed are concerned. But the solution may also be distilled in a vacuum and then hardened to form molded, transparent objects.

V

To 150 parts by weight of a 90% hydrophile sol from urea and formaldehyde 150 parts by weight of methyl-alcohol are added. Thereby initially white flocks will be precipitated, which however, dissolve afterwards in the excess. To this solution 50 parts by weight of a 10% solution of acetyl-cellulose in benzyl-alcohol are added. This mixed organosol can be utilized for all the purposes indicated in Example III, that is as lacquer or for manufacturing articles of any form, such as films, plates, material for being turned, etc. The water still contained in the organo-sol escapes as in Example IV.

VI 250 parts by weight of a hydrophile condensation product of urea and formaldehyde are concentrated in vacuo and thereby reduced to about 160 parts by weight. To the resulting mass, having the consistency of syrup, 50 parts by weight of ethyl-alcohol and 5 parts by weight of benzene (benzol) are added. The mixture will at the beginning be cloudy but after short time will become clear, whereafter the clear solution is subjected to distillation in vacuo. After the bulk of the liquid has been expelled, another 50 parts by weight of ethyl-alcohol are added and also distilled off in the vacuum. After the greatest part of the liquid is expelled, another 50 parts by weight of ethyl-alcohol are added and also distilled off in the vacuum. After the greatest part of the liquid is expelled a solution of 2 parts by weight of camphor in 5 parts by weight of benzyl-alcohol is added and the mass is for a short time concentrated in the vacuum. Thereafter the clear mixture is poured into molds and hardened at temperatures up to 100° C.

The gels thus obtained are transparent, perfectly stable and have the aspect of mountain (pebble) crystal.

VII

To 150 parts by weight of a hydrophobe condensation product from urea and formaldehyde 10 parts by weight of benzyl-alcohol are added and 20 parts by weight of camphor dissolved in as little alcohol as is possible. The mixture is then well kneaded. The resulting mass is dough-like and loses the remaining water on hardening. The hardened gel may be used for making transparent objects of any kind or form, which will have a high degree of elasticity.

VIII

To 100 parts by weight of a hydrophile condensation product of urea and formaldehyde 20 parts by weight of glycerine are added, then the mass is concentrated. Thereafter 5 parts by weight of an agent accelerating the hardening are added, such as for instance ammonium-phosphate. The mixture will set after a short time to a hard, transparent, glass-clear gel, which without any further hardening can be taken out from the molds and be worked by any mechanical means.

IX 150 parts by weight of a hydrophile condensation product of urea and formaldehyde are evaporated to the consistency of syrup, then 2 parts by weight of acetanilide, dissolved in water, are added and distillation is continued. Thereafter the mass is poured into molds and hardened. Transparent, glass-clear masses are obtained thereby, the elasticity of which is considerably higher than that of similar masses hitherto made.

X

To 150 parts by weight of a hydrophobe condensation product 10 parts by weight of a 10% solution of anilide of benzoic acid in benzyl-alcohol are added. The mass is then distilled and poured into molds. The hardened gels obtained thereby are also transparent, clear as glass and stable.

XI

To 100 parts by weight of a hydrophobe condensation product of urea and formaldehyde 50 parts by weight of ethyl alcohol are added and the mixture is evaporated. Thereafter one part by weight of naphthalene dissolved in 8 parts by weight of benzyl-alcohol is added and the mixture is distilled to the consistency of syrup. Then the mass is poured into molds and hardened. Also by these steps transparent, glass-like, perfectly stable masses are obtained.

I wish it to be understood that I do not desire to be limited to the exact details and proportions as described, for obvious modifications will occur to any person skilled in the art.

In the following claims I use the term "urea" to include not only urea and its derivatives, but also any prime material yielding urea or derivatives thereof.

In this specification, by "hydrophile emulsion colloids" such emulsoids are understood, which are capable of being mixed with water to form uniform, homogeneous colloidal solutions, whilst "hydrophobe emulsoids" do not mix with water or do so only to an exceedingly low extent, and therefore during their generation from watery solutions are themselves mechanically separated. The meaning of these expressions and the way of producing either hydrophile or hydrophobe emulsion colloids is explained in the U. S. A. patent application Serial No. 700,736 filed March 20, 1924, Patent No. 1,687,312 of Oct. 9, 1928 and particularly on page 6, lines 6 to 20 thereof.

As to the solvents to be added their subdivision into the groups A, B, C has been made with regard to their function.

The solvent A performs the function of replacing the water in the condensation products when still liquid, that is to say when they are still in the state of the sol, whilst the solvent B serves for assuring the capability of the concentrated product of being poured into the molds and this solvent must escape from the jelly during the hardening. Some of the solvents used possess both these functions.

The solvent C is destinated to building up the final hardened gel and therefore must remain within the mass.

It is to be pointed out, that these different functions must not necessarily be accomplished by different solvents. On the contrary in practice operations are mostly carried out in such manner, that the solvents A and B are identical. Only C is nearly always different from A and B.

The action of these solvents is in no way a dehydrating one, as is for instance the case with the action of the sulphuric acid, nor does a chemical combination of these solvents with water take place, but the action of the solvent is such, that it furnishes the amount of the respective liquid necessary for the formation of the sol and for the building up of the jelly by replacing the water thereof.

What I claim is:

1. In the process for manufacturing condensation products from a urea and formaldehyde, the step which comprises adding to the initial condensation products, prior to the sol being transformed into the gel, organic solvents possessing the property of forming with water vapors volatile vapor mixtures and removing water from the reaction mixture by distillation.

2. A process for the production of condensation products from urea and an aldehyde characterized by the fact that an organic fluid is added to the watery solutions of the initial condensation product, such organic fluid being volatile with water vapor and driving off the water, in part at least, by the evaporation of the organic fluids, and at not later than the end of this evaporation step, adding an organic medium which has a higher boiling point than water and which like water, and in the place of water participates in the formation of sols from the condensation products, and gives clear solutions with them.

3. A process for the production of condensation products from urea and formaldehyde characterized by the fact that an organic fluid is added to the watery solutions of the initial condensation product, such organic fluid being volatile with water vapor, and driving off the water, in part, by the evaporation of the organic fluids, and that not later than the end of this evaporation step, an organic medium is added which has a higher boiling point than water and which like water and in the place of water participates only in the formation of sols from the condensation products, and gives clear solutions with them.

4. A process for the production of condensation products from urea and formaldehyde characterized by the fact that an organic fluid is added to the watery solutions of the initial condensation product, such organic fluid being volatile with water vapor, and driving off a part at least of the water by the evaporation of the organic fluids, and that not later than the end of this evaporation step, glycerine is added.

5. A process for the production of condensation products from urea and formaldehyde characterized by the fact that an organic fluid is added to the watery solutions of the initial condensation product, such organic fluid being volatile with water vapor, driving off at least a part of the water by the evaporation of the organic fluids and that not later than the end of this evaporation step, an alcoholic substance having a boiling point which is substantially above that of water is added, such alcoholic substance being one that mixes clear with the condensation product.

6. The step of adding a plurality of organic solvents including glycerine and liquids which form low boiling mixtures with water, to the syrupy intermediate condensation product of urea and an aldehyde, and heating sufficiently to drive off at least a part of the water and to drive off at least a part of the other volatile solvents present, whereby a highly elastic resinous product is produced.

7. In the formation of condensation products of urea and an aldehyde, the step of adding glycerine at a stage not later than the finishing of the evaporation of liquid from the syrupy intermediate condensation product, substantially as described, the amount of such glycerine being sufficient to aid in the condensation reaction and to form a transparent mass with such condensation product.

8. A process for the production of condensation products from urea and formaldehyde, characterized by the fact that organic fluids are added to the watery solutions of the initial condensation product, produced in any desired manner, which organic fluids are volatile with water vapor, that the water and organic fluids are at least partly driven off by evaporation and that before the end of this evaporation, organic media are added which have a higher boiling point than water and which participate only as sol-forming media in the formation of condensation products, and give clear solutions with them, and which are able to form clear gels with the condensation properties.

9. Process for the production of organosols or organo-gels from a watery condensation product of urea and formaldehyde, which comprises adding an organic fluid to a water solution of the starting condensation product, the said fluid being volatile with water vapor, and evaporating such fluid whereby the water present is at least partly driven off by means of the organic fluid, and further organic media are added which give clear solutions with the condensation products and which have a higher boiling point than water, so that they are not removed in the subsequent evaporation or hardening of the jelly, and which participate in the formation of the sol, similarly to water and in place of water, only as sol forming means.

10. A composition comprising a hydrophobe urea-formaldehyde condensation product and an organic softening agent belonging to the group consisting of camphor, borneol, acetanilide, anilide of benzoic acid, and naphthalene.

11. A composition comprising a hydrophobe urea-formaldehyde condensation product and acetanilide.

12. In the process for manufacturing condensation products from a urea and formaldehyde, the steps which comprise adding an organic medium possessing the property of forming with water vapors volatile vapor mixtures to an initial condensation product, and volatilizing water to form an organic solvent soluble reaction product.

13. In the process for manufacturing condensation products from a urea and formaldehyde, the steps which comprise reacting a urea and aqueous formaldehyde to form an initial condensation product, and removing water from said condensation product by heating in the presence of an alcohol until a product is obtained having substantially no water vapor tension.

14. In the process for manufacturing condensation products from a urea and formaldehyde, in combination, the steps which comprise reacting a urea and aqueous formaldehyde to form an initial condensation product, treating said condensation product with a non-aqueous medium, and volatilizing water to form an organic solvent soluble reaction product.

15. In the process for manufacturing condensation products of a urea and formaldehyde, in combination, the steps which comprise removing water from an initial condensation product by treating with a non-aqueous organic medium capable of forming a volatile vapor mixture with water vapor and vaporizing said volatile mixture until an organic solvent soluble reaction product is obtained.

16. In the process for manufacturing condensation products of a urea and formaldehyde, in combination, the steps which comprise effecting reaction between a urea and formaldehyde in the presence of a non-aqueous organic medium capable of forming a volatile vapor mixture with water vapors and vaporizing said volatile mixture to form an organic solvent soluble reaction product.

17. A composition of matter comprising a hydrophobe urea formaldehyde condensation product having the characteristics of a product produced by the process defined in claim 14 and dissolved in an organic solvent, said solution having substantially no water vapor tension.

18. In the process for manufacturing condensation products from a urea and formaldehyde, in combination, the steps which comprise reacting a urea and aqueous formaldehyde to form an initial condensation product, treating said product with a non-aqueous volatile solvent, volatilizing water and solvent mixture, adding a substantially non-volatile organic medium, and volatilizing remaining volatile solvent and water to form an organic solvent soluble product.

19. A composition comprising a hydrophobe urea condensation product and a non-volatile organic softening agent, said composition having the characteristics of a product produced by the process of claim 18.

KURT RIPPER.